(12) United States Patent
Fukuda

(10) Patent No.: US 6,526,269 B1
(45) Date of Patent: Feb. 25, 2003

(54) WEATHER BROADCAST SCANNING TRANSCEIVER

(75) Inventor: Yoshihiko Fukuda, Tokyo (JP)

(73) Assignee: Vertex Standard Co. Ltd. (JP)

( * ) Notice: Subject to any disclaimer, the term of this patent is extended or adjusted under 35 U.S.C. 154(b) by 0 days.

(21) Appl. No.: 09/362,641

(22) Filed: Jul. 27, 1999

(30) Foreign Application Priority Data

Jul. 28, 1998 (JP) .......................................... 10-006079

(51) Int. Cl.$^7$ ................................................ H04Q 7/20
(52) U.S. Cl. .................................. 455/188.1; 455/186.1
(58) Field of Search ................................. 455/132, 133, 455/180.1, 185.1, 186.1, 188.1, 425, 227, 228, 521, 575, 161.2, 166.2, 434, 525; 340/601

(56) References Cited

U.S. PATENT DOCUMENTS

| | | | | | |
|---|---|---|---|---|---|
| 4,123,717 A | * | 10/1978 | Yiu et al. | ................. | 455/166.2 |
| 4,267,597 A | * | 5/1981 | Volpi et al. | ................. | 370/278 |
| 4,270,213 A | * | 5/1981 | Falk et al. | ................ | 455/158.2 |
| 4,270,217 A | * | 5/1981 | Baker | ....................... | 455/165.1 |
| 4,484,357 A | * | 11/1984 | Fedde | ..................... | 455/166.2 |
| 4,792,986 A | * | 12/1988 | Garner et al. | ............ | 455/186.2 |
| 4,888,815 A | * | 12/1989 | Ahlemeyer et al. | ....... | 455/168.1 |
| 5,144,440 A | * | 9/1992 | Wignot et al. | .............. | 348/725 |
| 6,052,569 A | * | 4/2000 | Ehrhardt et al. | ......... | 455/188.1 |
| 6,181,921 B1 | * | 1/2001 | Konisi et al. | ................ | 348/725 |
| 6,246,866 B1 | * | 6/2001 | Phang et al. | ............. | 455/188.2 |

* cited by examiner

*Primary Examiner*—Dwayne Bost
*Assistant Examiner*—Jean A Gelin
(74) *Attorney, Agent, or Firm*—Fulwider Patton Lee & Utecht, LLP

(57) ABSTRACT

An object of the present invention is to provide a transceiver, capable of receiving radio signals in a radio communication apparatus, and capable of receiving one to two channels for regional information such as weather from a large number of channels.

The transceiver comprises a radio communication section and a weather broadcast receiving section. A channel of radio communication and a weather reception are selected by a channel switch, and a selecting section selects radio channel signal reception or weather channel signal reception by use of a control signal sent from a CPU of a control section. If the weather reception is selected and weather channel frequency data is stored in a memory, the weather channel reception can be carried out. If no weather channel frequencies are stored therein, a weather frequency band is scanned to detect weather channel frequencies, and detected frequencies are temporarily stored in the memory and can be used until the power supply is turned off.

A weather channel signal strength is reduced as the receiver is moved across the country. When the weather channel signal becomes weaker, if a PTT switch is depressed, a frequency scan is carried out to detect a new weather channel, and frequency data of the weather channel stored in the memory is rewritten, and such rewritten frequency data can be used in a subsequent weather reception.

13 Claims, 3 Drawing Sheets

WEATHER BROADCAST SCANNING TRANSCEIVER

BACKGROUND OF THE INVENTION

1. Field of the Invention

The present invention relates to a transceiver for receiving radio signals. More specifically, this invention relates to a transceiver with the additional function of storing frequency data detected by scanning the known weather channel frequencies for good radio signals.

2. Detailed Description of the Related Art

There are ten radio stations in the United States of America dedicated solely to broadcasting weather information on a nationwide scale. The frequencies of the respective stations WX1 to WX10 are 162.550 MHz, 162.400 MHz, 162.475 MHz, 162.425 MHz, 162.450 MHz, 162.500 MHz, 162.525 MHz, 162.650 MHz, 162.775 MHz, and 163.275 MHz, respectively. Typically, two or three weather stations can be received in any region of the country.

There are a number of radio transceivers that comprise the prior art. However, only a few transceivers have any special feature directed to receiving weather information. However, these transceivers suffer from one or more of the following shortcomings:

One problem with the prior art is that in order to be received, weather channels have to be manually selected. To select a channel, it is necessary to display the channel frequency and use a switching device to manually select the channel. This process can become cumbersome, especially when the person selecting the channels is a trucker who is also driving. Moreover, it is often difficult to manually determine which of the weather channel frequencies is the best signal.

Another problematic prior art method utilizes a memory in which the aforementioned ten weather channels are pre-stored. In this method, all the weather channel frequencies are pre-scanned, and the frequencies of the good weather channel signals are then stored in memory, where the means for selectively setting the channel is based on a program in combination with a CPU. However, in such means, a display device for displaying the frequency of a stored channel signal and a number of memories corresponding to the number of channels are required to set the channel. In addition, a memory such as a ROM, etc., which is not erased even if the power supply is turned off, is needed. Consequently, the operation is complicated, bulky in size, and expensive to build.

Although the miniaturization of the modern transceiver has improved the size and cost of the transceiver, the operation for receiving weather broadcast is still too complicated. For example, frequency data of each of the weather broadcast stations is typically stored in advance, requiring a separate memory for selecting the frequency (hereinafter referred to as channel).

Another shortfall of the prior art occurs because the good weather station signals change with the movement of the portable transceiver. For this reason, every time when the transceiver is moved, the weather channel must be re-selected. This problem particularly impacts ambulatory people, such as truckers, who travel across the country.

SUMMARY OF THE INVENTION

The present invention provides a solution to the problems shortfalls of the prior art. More specifically, a scan for a weather channel is performed by simply turning a channel switch, and a scan result is memorized so that a weather channel can be received.

The present invention provides a transceiver for receiving radio communications as well as weather channel broadcasts, comprising: a means for selecting a plurality of radio channels and two weather channels; and channel setting means for performing a channel change when one or two weather channels are selected by the channel selecting means, and for receiving weather channels when weather channel frequencies are temporarily stored.

The transceiver of the present invention also comprises means for searching for a weather channel if no weather channel frequency data is temporarily stored in memory, and for temporarily storing detected weather channel frequency data. A weather channel frequency temporarily stored is received when the weather channels are selected by the channel selecting means.

Moreover, the transceiver of the present invention comprises a weather channel changing means. At the time of selecting the weather channels and changing the channel to the other one or two weather broadcast channels, if a PTT switch for transmission is depressed, the data changing means starts searching for a new weather broadcast channel, and temporarily stores a detected new weather broadcast channel in the memory.

Further, according to the transceiver of the present invention, the weather broadcast channel selecting means comprises a rotary switch and means for selecting a communication channel or a broadcast channel by switching the rotary switch.

DETAILED DESCRIPTION OF THE PREFERRED EMBODIMENT

An embodiment of the present invention will now be specifically described with reference to the accompanying drawings.

Figure 1:
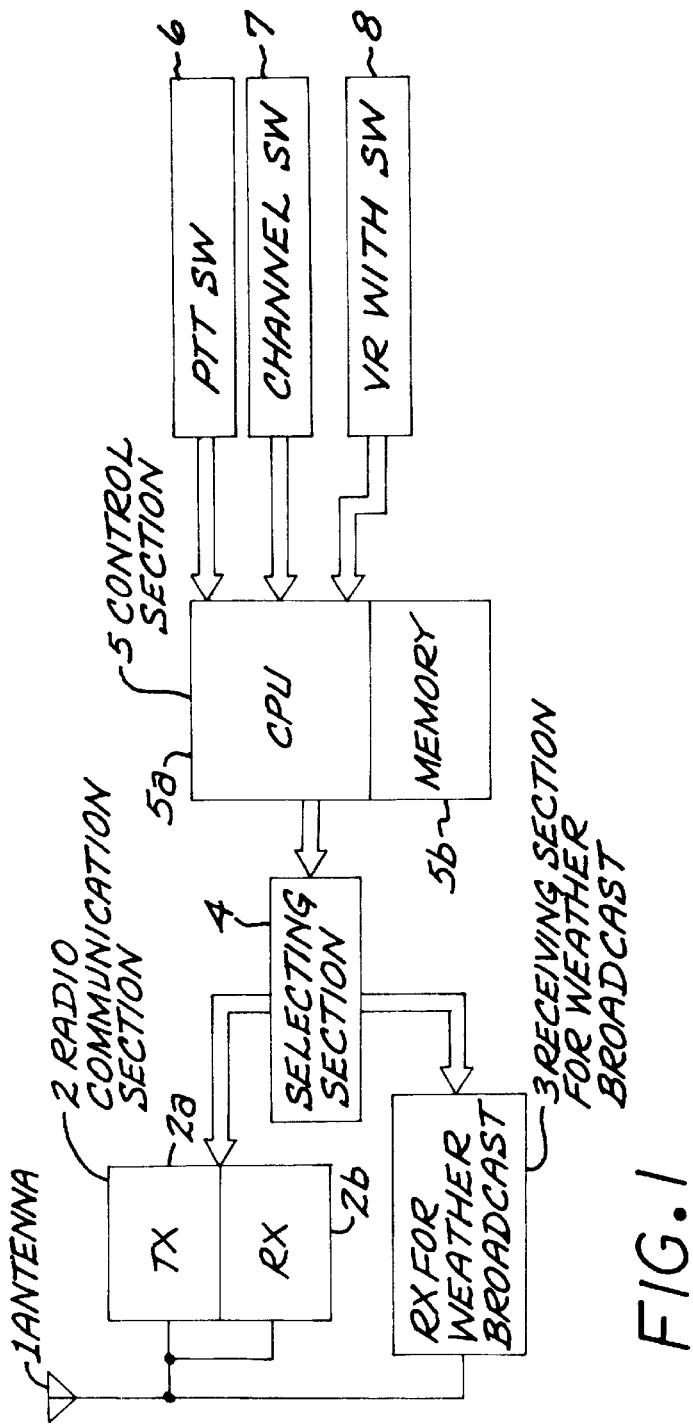
FIG. 1 is a block diagram showing the main parts of a transceiver according to the present invention.
Figure 2:
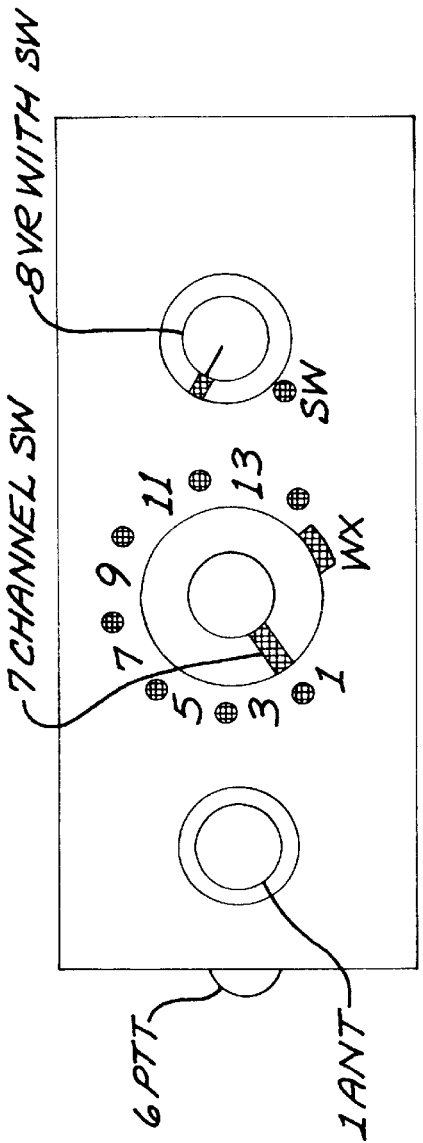
FIG. 2 is a view showing a control panel surface of the transceiver according to the present invention.

The transceiver illustrated in FIG. 1 is comprised of an antenna 1; a radio communication section comprising a transmission section 2a and a receiving section 2b; a receiving section 3 for a weather broadcast; a selecting section 4 for selecting and setting either the radio communication section or the weather broadcast receiving section by a control signal; a control section 5 comprising a CPU 5a and a memory 5b; a PTT switch 6; a channel switch 7; and a volume with a switch SW 8. As shown in FIG. 2, the PTT switch 6 is formed on a side surface, and the antenna 1, the channel switch 7, and the volume with a switch SW 8 are formed on a control panel surface.

First, the block diagram of FIG. 1 showing the main parts of the transceiver of the present invention will be explained. According to the embodiment of the present invention, there are two modes of operation of the transceiver. One using the Radio communication section 2 (radio communication mode), and the other using the weather broadcast receiving section 3 (weather broadcast receiving mode). A frequency band to be used in this radio communication apparatus is set to about 460 MHz. For example, fourteen channels including 462.5625 MHz to 467.7125 MHz can be selected. While the known weather station frequencies can be scanned in the weather broadcast mode. Thus, counting both modes, a total of sixteen circuits including fourteen radio communication channels and two weather broadcast channels can be selected by the channel switch 7 provided in the control section of the radio communication apparatus.

In the radio communications mode, the channel switch 7 selects the radio communication channels 1 to 14. At this time, when the PTT switch 6 is depressed, the control signal is output to the selecting section 4 from the CPU 5a of the control section 5. The selecting section 4 then sets the radio communication section 2 to an operation state and the receiving section 2b to a receiving state. If the PTT switch 6 is depressed in this state, the transmitting section 2a can transmit, and communications can occur.

On the weather broadcast receiving mode, the channel switch 7 selects N−1 or N on the weather channel side. When the frequency data of the weather channel is stored in the memory, the channel is received and its voice is output. If there is no receivable weather frequency data, scanning between 161 MHz and 164 MHz of the weather frequency band is automatically carried out. Then, if a signal is detected, frequency data of the channel is temporarily stored in the memory 5b and the receivable state is established at the weather channel.

The memory 5b may be a RAM memory whose storage can be maintained if power is turned on by the volume with a switch SW 8. For this reason, the channel switch 7 is typically switched to N−1 or N on the weather channel side at the time when the transceiver is first being used. Then, if no frequency data has been stored in the memory 5b, frequency data, which has been detected by scanning the weather channel automatically, is stored therein. This can be used anytime until the power supply is turned off. When the receiving state of the weather channel stored is bad because of the movement of the transceiver, if the PTT switch 6 for transmission is depressed, the scanning search is carried out again so that a new weather channel is detected, and the memory 5b is rewritten.

Figure 3:
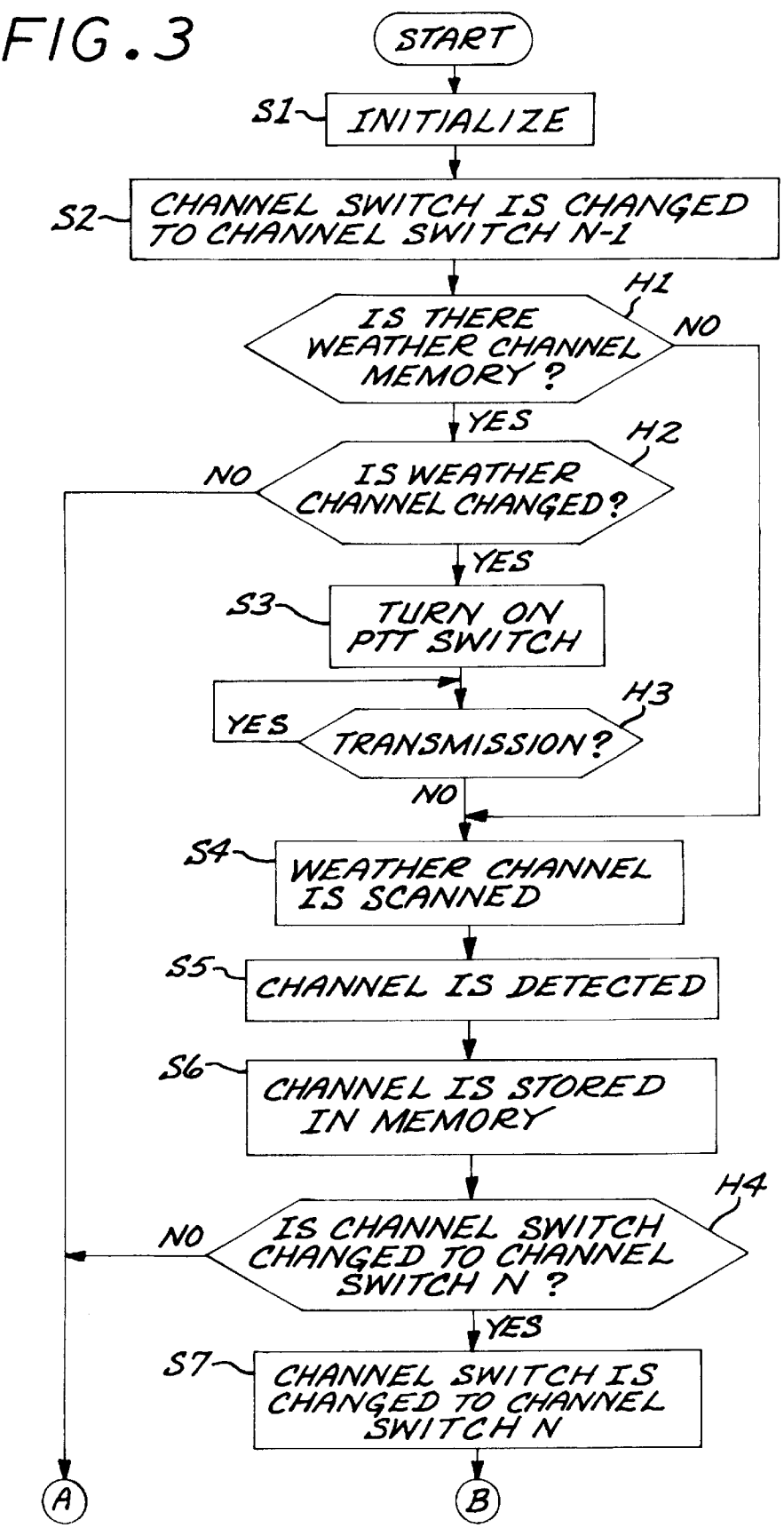
FIG. 3 is a flowchart showing a search for a weather broadcast of the transceiver according to the present invention.
Figure 3:
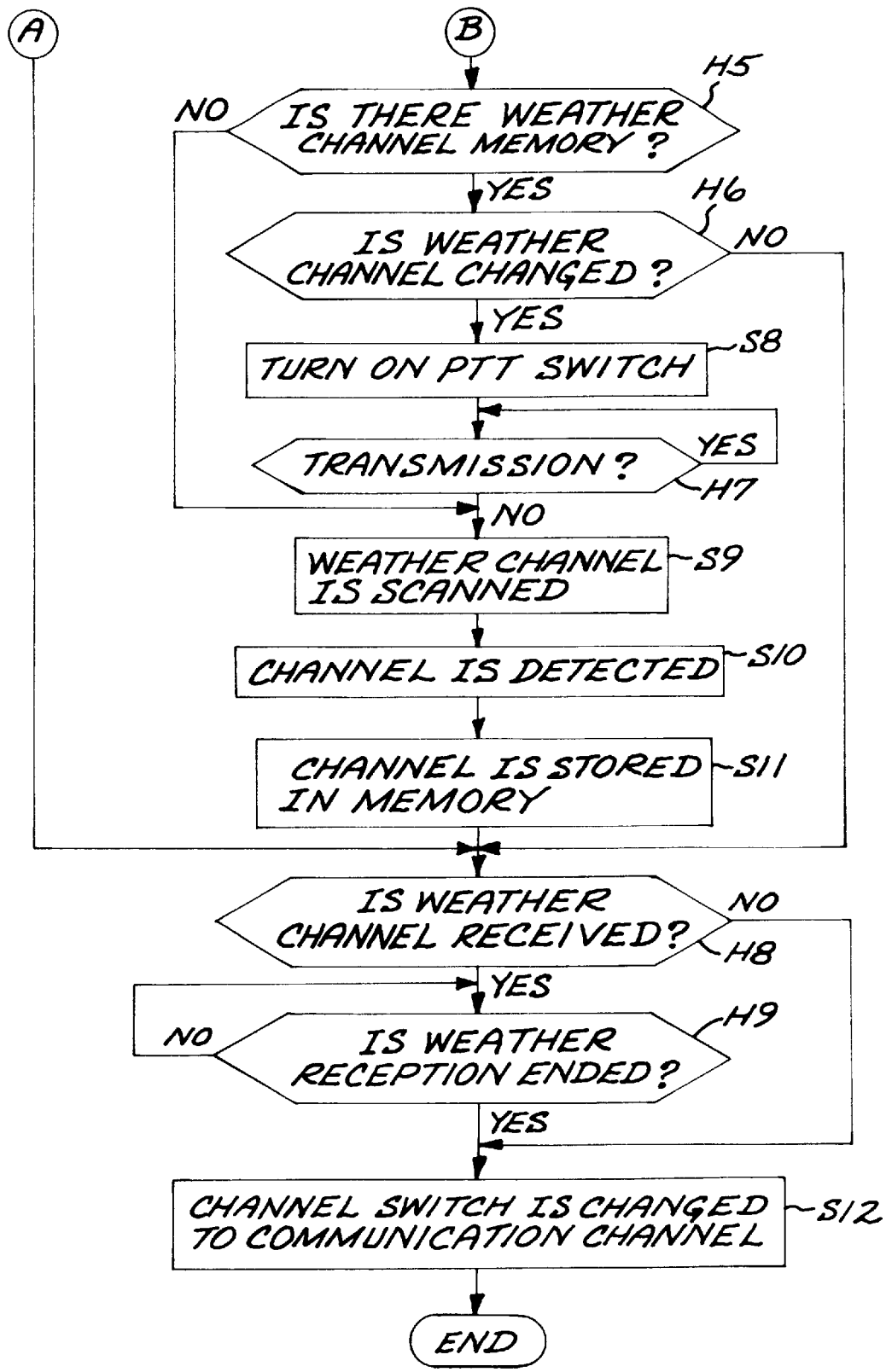

Next, the present invention will be explained with reference to the flowchart of FIG. 3. In step S1, initialization is carried out and the channel switch 7 is changed to channel switch N−1 from the radio communication setting in step S2. In step H1, it is determined whether frequency data of the weather channel is stored in the memory. If no frequency data is stored therein, the operation goes to step S4. If frequency data thereof is stored therein, it is determined whether the aforementioned weather broadcast channel or the other weather broadcast channel is reselected in step H2.

If the weather broadcast channel is changed in step H2, the operation goes to step S3; if unchanged, however, the operation jumps to step H8. If the PTT switch 6 for transmission is turned on in step S3, it is determined whether or not transmission is performed by radio communication in step H3. If no transmission is performed, then the frequency band of ten weather broadcast channels is scanning searched in step S4 in the same manner as where it is determined that no data is stored in the memory in the aforementioned step H1. Next, in step S5, a channel in an appropriate receiving state is detected, and frequency data of the weather broadcast channel is temporarily stored in the memory in step S6.

It is then determined whether the channel switch 7 is changed to another weather broadcast channel N in step H4.

If the channel switch 7 is changed to another weather broadcast channel N, the operation goes to step S7 and the channel switch 7 is changed to N. However, if the channel switch 7 is not changed to another weather broadcast channel N in step H4, the operation goes to step H8.

In step H8, it is determined whether the weather broadcast is received. If the weather broadcast is received, the receiving state is maintained until the reception of the weather broadcast ends in step H9. Then, as where no weather broadcast is received in step H8, the channel switch 7 is changed to the radio communication channel in step S12 so as to return the transceiver to the normal state.

If the channel switch 7 is changed to N in step S7, the same processing as executed in steps H1 through S6 is carried out in steps H5, H6, and S8–11. After the determination in step H7 of whether the weather broadcast channel is changed and the storage of channel frequency data in step S11, the operations in steps H8, H7, and S12 are carried out.

The transceiver of the present invention comprises means for selecting a plurality of communication channels by use of the channel switch. The channel switch can select a pair of weather channels. If the weather channel side is selected by the channel switch and no weather channel frequency data is temporarily stored in the memory, the weather channel, which has been received by scanning the frequency band of the weather broadcast, is temporarily stored in the memory.

If the weather channel is selected by the channel switch and the weather channel frequency is temporarily stored in the memory, the weather channel is received and its voice is output. The weather channel may be changed to the other weather channel by the channel switch when bad receiving conditions exist.

In the case of searching a new weather channel, the PTT switch is depressed to scan the weather frequency band. Then, the memory is rewritten using weather channel frequency data detected by the scan. The transceiver of the present invention has the advantage of determining through the use of a simple operation whether broadcast information can be obtained.

What is claimed is:

1. A transceiver, operable to receive a frequency data for a weather broadcast, and which is controlled by a CPU of a control section, comprising:

channel selecting means for selecting a plurality of radio communication lines and two weather broadcast channels;

broadcast channel setting means for performing a change to broadcast channels when one or two weather broadcast channels are selected by said channel selecting means, and for receiving a voice output from the weather broadcast channel if the frequency data of the weather broadcast channel is temporarily stored; and data changing means for weather broadcast channels wherein at the time of selecting the weather broadcast channels and changing a channel to the other weather broadcast channel in a receivable state and, if a PTT switch for transmission is depressed, said data changing means restarting the search for the weather broadcast to detect a new weather broadcast channel, and temporarily storing the detected new weather broadcast channel in the memory.

2. A transceiver, operable to receive a frequency data for a weather broadcast, and which is controlled by a CPU of a control section, comprising:

channel selecting means for selecting a plurality of radio communication lines and two weather broadcast channels;

broadcast channel setting means for performing a change to broadcast channels when one or two weather broadcast channels are selected by said channel selecting means, and for receiving a voice output from the weather broadcast channel if the frequency data of the weather broadcast channel is temporarily stored;

means for starting a search for a frequency band of the weather broadcast channels if no weather broadcast to detect the weather broadcast channels if no weather broadcast channel frequency data is temporarily stored when said transceiver selects the weather broadcast channels, and for temporarily storing the detected weather broadcast channels as weather broadcast channel frequency data, where the weather broadcast channel temporarily stored is received and voice output when the weather broadcast channels are selected by said channel selecting means; and data changing means for weather broadcast channel wherein at the time of selecting the weather broadcast channels and changing the channel to the other weather broadcast channel in a receivable state, where if a PTT switch for transmission is depressed, said data changing means restarting the scanning search for the weather broadcast to detect a new weather broadcast channel, and temporarily storing the detected new weather broadcast channel in the memory.

3. The transceiver according to claim 1, wherein said weather broadcast channel selecting means comprises a rotary switch and means for selecting a communication channel or a broadcast channel by switching said rotary switch.

4. A transceiver for scanning weather channels comprising:

a control section having a central processing unit (CPU) and a memory with sufficient capacity to temporarily store at least one weather broadcast frequency data;

a channel selector in communication with said CPU and operable to select from a plurality of radio communication channels or from at least one weather broadcast channel corresponding to a predetermined range of weather broadcast frequencies; and a weather broadcast channel setter in communication with said CPU and operable to automatically scan said range of weather broadcast frequencies for a signal and set said transceiver in a receivable state to receive a voice output from said weather broadcast channel when one of said weather broadcast channels is selected by said channel selector and said memory does not store a weather broadcast frequency.

5. The transceiver of claim 4 further including:

a switch to initiate automatic scanning of said range of weather broadcast frequencies for a signal when depressed.

6. The transceiver of claim 3 wherein:

said switch is a push-to-talk switch.

7. The transceiver of claim 4 wherein:

said predetermined range of weather broadcast frequencies is approximately 161 MHz to 164 Mhz.

8. The transceiver of claim 4 wherein:

said memory is a random access memory (RAM).

9. A transceiver comprising:

a radio transmission component including a transmission section and a receiving section;

a dedicated weather broadcast component;

an antenna coupled to said components;

a control section including a central processing unit with a selector for selecting between said radio transmission component and said weather broadcast component and a volatile memory for storing a weather broadcast frequency;

a rotary switch for selecting from a plurality of radio communication channels or from at least two weather broadcast channels;

a push-to-talk switch for initiating automatic scanning a range of frequencies associated with said weather broadcast channels;

a power switch for activating said transceiver; and whereby upon activating said transceiver by actuating said power switch and further selecting one of said weather broadcast channels with said rotary switch, said memory may be searched by said CPU to determine if a weather broadcast frequency is stored therein and if not, then automatically scanning said range of weather broadcast frequencies until a signal is found, said frequency at which said signal is found being stored in said volatile memory and said signal being voice output over said selected weather channel.

10. A method for selecting a weather broadcast frequency comprising:

providing a transceiver including a central processing unit and a temporary memory;

providing a channel selector in communication with said central processing unit and operable to select from a plurality of radio communication channels or from at least two weather broadcast channels;

providing a broadcast channel setter in communication with said central processing unit and operable to automatically scan a predetermined range of weather broadcast frequencies until a signal is found if a frequency setting is not stored within said memory;

applying power to said transceiver;

selecting a weather broadcast channel with said channel selector; and accessing said memory for a frequency setting to output said signal being received on said channel frequency and upon finding none automatically scanning said predetermined range of weather broadcast frequencies until a signal is found and upon finding said signal storing said frequency at which said signal is found in said memory.

11. A method for selecting a weather broadcast frequency as set forth in claim 10 further comprising:

selecting a push-to-talk switch to initiate automatic scanning of said predetermined range of weather broadcast frequencies.

12. A method for selecting a weather broadcast frequency as set forth in claim 10 wherein:

upon accessing said memory if a weather channel is selected with said channel selector and finding no frequency setting stored therein, automatically scanning between 161 MHz and 164 MHz.

13. A method for updating a weather broadcasting frequency comprising:

providing a transceiver with a radio communication mode with a plurality of channels operable to receive and transmit over a radio frequency and a weather broadcasting mode with at least two channels operable to broadcast voice output received over a weather broadcast frequency, said transceiver further including a temporary memory for storing frequency data;

providing a channel selector for selecting a channel in one of said modes;

selecting a channel to initiate said weather broadcasting mode;

accessing said temporary memory for said frequency data and, upon locating said frequency data, broadcasting said voice output over said selected channel or, upon not finding said frequency data in said memory, automatically scanning a predetermined range of frequencies over said weather channel to acquire a signal; and upon successfully acquiring a signal, storing said frequency associated with said acquired signal in said temporary memory and broadcasting said voice output thereover.

* * * * *